United States Patent [19]
Takada

[11] 3,860,261
[45] Jan. 14, 1975

[54] VEHICLE SAFETY BELT SYSTEM

[75] Inventor: Takezo Takada, Hikone, Japan

[73] Assignee: Takata Kojyo Co., Ltd., Tokyo, Japan

[22] Filed: May 7, 1973

[21] Appl. No.: 357,994

[30] Foreign Application Priority Data
May 13, 1972   Japan.............................. 47-55124

[52] U.S. Cl............................ 280/150 SB, 180/82 C
[51] Int. Cl............................................ B60m, B60r
[58] Field of Search....... 280/150 SB; 297/388, 389; 180/82 C

[56] References Cited
UNITED STATES PATENTS
3,567,247   3/1971   Sobkow et al................. 280/150 SB Primary Examiner—Allen N. Knowles
Attorney, Agent, or Firm—Wolder & Gross

[57] ABSTRACT

A vehicle safety belt system includes a first belt guide mounted to the vehicle body above the shoulder level of a seat occupant and first and second retractor reels mounted below the first belt guide. A shoulder belt extends from the first reel through the first guide and a waist belt extends from the second reel, the free ends of the belts being joined at a buckle member which releasably engages a mating coupling member at the other side of the seat. A second guide member is attached to and may be adjustable along the length of the shoulder strap either at the section between the reel and first guide member or the section on the opposite side of the first guide member and slideably engages the other shoulder belt section. The second guide member is so positioned along the shoulder belt sections that when the belt is in its buckled position the second guide member deflects the shoulder belt rearwardly from the occupant's shoulder to form an angle to the horizontal between 25° upwardly from the shoulder to 5° downwardly from the shoulder.

6 Claims, 4 Drawing Figures

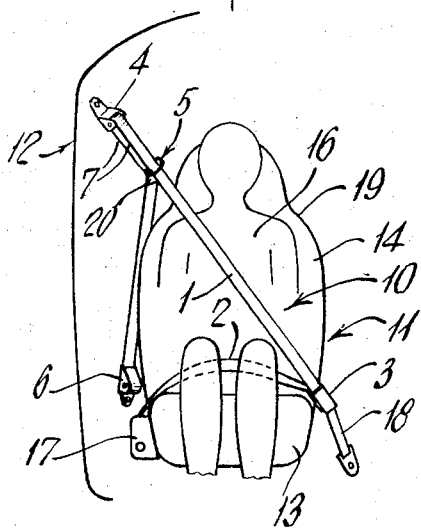
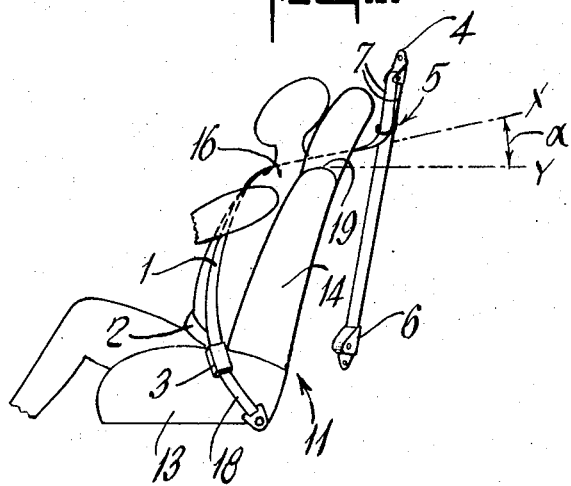
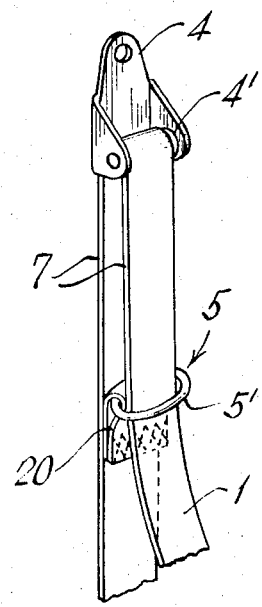
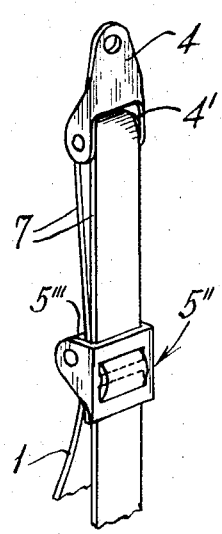

VEHICLE SAFETY BELT SYSTEM

BACKGROUND OF THE INVENTION

The present invention relates generally to improvements in vehicle safety devices and it relates more particularly to an improved vehicle occupant safety belt system.

A conventional form of safety belt system employed in automobiles is of the combination shoulder belt and waist belt or three point type in which a waist belt extends from a lower side of the vehicle seat and a shoulder belt extends from an upper side part of the vehicle, such as the upper part of a vehicle pillar or the side of the vehicle roof and the opposite ends of the belts are joined at a coupling member, such as a buckle or coupling tongue. This type of safety belt arrangement possesses numerous drawbacks and disadvantages, particularly in connection with the operation and functioning of the shoulder belt. The shoulder belt extends diagonally across the front of the seat occupant and above his shoulder to a raised point in such a manner as not to properly restain the upper part of the occupant's body. The occupant is free to excessively shift and move even under locked restraint by the shoulder belt, so that in the event of a rapid deceleration attendent to a collision the restraint afforded by the conventional shoulder safety belt on the seat occupant is frequently insufficient and does not prevent or minimize injury to the seat occupant.

SUMMARY OF THE INVENTION

It is a principal object of the present invention to provide an improved vehicle seat occupant safety belt system.

Another object of the present invention is to provide an improved shoulder type vehicle seat safety belt.

A further object of the present invention is to provide a safety shoulder belt which is adapted for use in conventional automobiles and suitably restrains the forward movement of the seat occupant's body consequent to a collision to prevent and minimize injury to the occupant.

Still a further object of the present invention is to provide an improved shoulder and waist safety belt system.

Another object of the present invention is to provide a safety belt system of the above nature characterized by its ruggedness, reliability and high versatility and adaptability.

The above and other objects of the present invention will become apparent from a reading of the following description taken in conjunction with the accompanying drawings which illustrate preferred embodiments thereof.

In a sense, the present invention contemplates the provision of a safety belt system for restraining an occupant in a vehicle seat comprising a shoulder belt extending diagonally across the front of the occupant from a lower first point at a first side of the seat to a second point at the opposite side of the seat and above the occupant's shoulder level, and a deflector member engaging the shoulder belt between the shoulder and the second point and drawing it rearwardly from the shoulder so that the angle of the belt to the horizontal is advantageously between 25° upwardly and 5° downwardly, and preferrably between 0° and 5°.

In the preferred form of the safety belt system as applied to a combination waist and shoulder belt of the three point type, a pair of belt retractor reels are located at the second point side of the seat below the second point and a first belt guide is mounted to a vehicle pillar at the second point. A shoulder belt extends from the first reel through the first belt guide and joins the end of a waist belt extending from the second reel at a coupling member which permits connecting the belt ends to a point at the first side of the seat. The deflector member includes a second belt guide which may be in the form of a ring and is attached to a section of the shoulder belt on one side of the first belt guide, either fixed or adjustable in position and slideably engages the section of the shoulder belt on the other side of the first belt guide to draw the parts of the shoulder belt sections extending from the first belt guide together at a point spaced from the guide.

The improved safety belt system is highly effective and reliable in restraining an occupant in a vehicle seat to minimize or prevent injury consequent to an accident and exceeds the rigid safety standards required of vehicle safety belts.

BRIEF DESCRIPTION OF THE DRAWINGS

FIG. 1 is a front elevational view of a safety belt system illustrated in the form of a combination shoulder and waist belt shown applied to a vehicle seat occupant;

FIG. 2 is a fragmentary perspective view of a portion thereof;

FIG. 3 is a view similar to FIG. 2 of another embodiment of the present invention; and FIG. 4 is a side elevational view of the safety belt system shown in FIG. 1.

DESCRIPTION OF THE PREFERRED EMBODIMENTS

Referring now to the drawings, and particularly FIGS. 1, 2 and 4 thereof which illustrate a preferred embodiment of the present invention, the reference numeral 10 generally deisgnates the improved safety belt system in the form of a combination shoulder and waist belt employed in association with a vehicle seat 11. The seat 11 is firmly mounted to the floor of an automobile vehicle body of the usual construction, including a roof and pillar sections. The seat 11 includes a seat portion 13 and a back portion 14 which extends to about the shoulder level of a normal person occupying the seat 11. Two or more seats 11 are generally located in the vehicle body 12.

A first belt retractor reel 17 is mounted on the side of the seat portion 17 proximate the vehicle side wall and a second belt retractor reel 6 is mounted to the vehicle side wall rearwardly of and slightly above the seat portion 13. The retractor reels 6 and 17 may be of known construction in which the reels are spring loaded to normally rewind the belts thereon and are either automatically locked against further withdrawal when withdrawn a desired amount or are automatically locked against withdrawal in response to a rapid deceleration such as upon the actuation of a vehicle mounted inertia switch.

A lap or waist belt 2 extends from the retractor reel 17 upon which it is wound and terminates at its free end in a releasable coupling member of a buckle assembly 3, the mating coupling member being anchored by short flexible band 18 to the floor of the vehicle proximate the side of seat portion 13 opposite the side at which retractor reel 17 is located.

Mounted to the upper part of the side wall of vehicle body 12 in any suitable manner, either to the wall, a vehicle body pillar or the roof proximate the side wall, is a belt guide 4 which may be of the type having a freely rotatable roller 4' or a stationary guide rod. The belt guide 4 is located in approximate vertical alignment with or slightly rearwardly of retractor reel 6 and above the level of the side shoulder portions 19 of the seat back portion 14.

A shoulder belt or strap 1 extends from the retractor reel 6 upon which it is partially wound upwardly through belt guide 4 and around guide roller 4' and is joined at its end either directly to the end of waist belt 2 or by way of a joining member or the releasable coupling member of buckle assembly 3. When the buckle assembly 3 is in its coupled condition the shoulder belt 1 extends diagonally across the front of the seat occupant 16 and the waist belt extends across the occupant's waist or lap. It should be noted that at least that part of the shoulder belt 1 which extends across the front of the occupant or the full length of belt 1 is formed of an energy absorbing web of the type having a non-recoverable elongation.

In order to better restrain and retain the occupant in the seat 11 in the event of a collision, in accordance with the present invention, a belt guide 5, including a ring 5', is secured to the inside face of the shoulder belt 1 at the portion thereof between retractor reel 6 and belt guide 4 when the shoulder belt 1 is in its extended buckled position by means of a belt loop 20 having an end thereof sewn to shoulder belt 1 and engaging the ring 5'. The ring 5' slideably engages the shoulder belt 1 between belt guide 4 and its free end to maintain the opposite portions 7 of shoulder belt 1 extending from belt guide 4 in relative overlapping positions.

The shoulder belt 1, belt guide 4, belt guide 5 and seat back 14 are so dimensioned and related, as best seen in FIG. 4, that when the belts are in their buckled condition, the belt guide 5 draws or deflects that section of the shoulder belt 1 extending rearwardly from the shoulder of the occupant 16 downwardly so that the angle $\alpha$ of the direction X of the belt rearwardly from the occupant's shoulder to the horizontal $\gamma$ is between +25° and −5°, that is the shoulder belt 1 extends rearwardly from the occupant's shoulder between an upward angle of 25° and a downward angle of 5° to the horizontal.

The belt system 10 is employed in the manner of the conventional three point restraining belt system, but a superior seat occupant restraining action is achieved by reason of the provision of the belt guide 5 in the manner described.

The embodiment of the present invention illustrated in FIG. 3 of the drawings differs from that first described only in the construction and association of the belt guide with the overlapping sections 7 of the shoulder strap 1. Specifically, instead of the belt guide 5 employing a ring 5' there is employed a belt guide 5'' including a bracket having a base plate provided with a pair of parallel transverse slots separated by a medial cross bar, a first portion of shoulder belt extending from one side of belt guide 4 passing successively through the slots and around the cross bar and thence along the inside faces of the bracket base plate. A guide roller 5''' is supported by the bracket spaced inwardly of the bracket base plate and the opposite or second portion of the shoulder belt extending from the belt guide 4 passes between the guide roller 5''' and the first belt portion. Thus the guide member 5'' is adjustable along the length of one portion of shoulder belt 1 extending from belt guide 4 and slideably engages the other portion of the belt guide extending from belt guide 4 to form overlapping belt section 7. In all other respects and in operation, the embodiments shown in FIG. 1 are similar to those of the embodiment first described.

While there have been described and illustrated preferred embodiments of the present invention, it is apparent that numerous alterations, omissions and additions may be made without departing from the spirit thereof.

I claim:

1. A safety belt system for restraining an occupant in a vehicle seat comprising a shoulder belt extending diagonally across the front of the occupant from a lower first point at a first side relative to said seat to an upper second point above the level of the shoulder of said occupant at a second side opposite said first relative to said seat means including a deflector member engaging said shoulder belt for deflecting said shoulder belt rearwardly from the path of said shoulder belt between said first and second points, a first belt guide member mounted to the body of said vehicle at said second point and a belt retractor device mounted to said vehicle body below said guide member, said shoulder belt extending from said retractor device along said guide member to said first point, and said deflector member interconnecting said belt between said first and second points and between said second point and said retractor device.

2. The safety belt system of claim 1 wherein the angle of the section of said shoulder belt between said belt engaging member and the occupant's shoulder does not exceed an angle of 25° to the horizontal.

3. The safety belt system of claim 1 wherein said deflector member comprises a guide member attached to said belt between said retractor device and said first guide member and slideably engaging said belt between said first and second points.

4. The safety belt system of claim 1 wherein said deflector member comprises a second guide member carried by and adjustable along the length of said belt between said first and second points and slideably engaging said belt between said retractor device and said first guide member.

5. A safety belt system for restraining an occupant in a vehicle seat comprising a shoulder belt extending diagonally across the front of the occupant from a lower first point at a first side relative to said seat to an upper second point above the level of the shoulder of said occupant at a second side opposite said first point relative to said seat, means including a deflector member engaging said shoulder belt for deflecting said shoulder belt rearwardly from the path of said shoulder belt between said first and second points, a waist belt having one end attached at the second side of said seat and a coupling member attached to the ther end of said waist belt, the end of said shoulder belt remote from said second point being attached to said waist belt proximate to said coupling member.

6. The safety belt system of claim 5 including a first belt guide member mounted to the body of said vehicle at said second point and a pair of first and second retractor reels mounted to said vehicle body below said first guide member, said shoulder belt extending from said first reel along said first guide member, said waist belt extending from said second retractor reel and said deflector means including a second belt guide member engaging a section of said shoulder belt between said first reel and first guide member and section of said shoulder belt between said first guide member and said coupling member.

7. A safety belt system for restraining an occupant in a vehicle seat comprising a shoulder belt extending diagonally across the front of the occupant from a lower first point at a first side relative to said seat to an upper second point above the level of the shoulder of said occupant at a second side opposite said first side relative to said seat, means including a deflector member engaging said shoulder belt for deflecting said shoulder belt rearwardly from the path of said shoulder belt between said first and second point, a first belt guide member mounted to the body of said vehicle at said second point and a belt engaging device mounted to said vehicle body below said guide member, said shoulder belt extending from said belt engaging device along said guide member to said first point, and said deflector member interconnecting said belt between said first and second points and between said second point and said belt engaging device.

* * * * *